United States Patent [19]

Nagel et al.

[11] Patent Number: 5,362,008
[45] Date of Patent: Nov. 8, 1994

[54] CASSETTE FOR SUPPLYING WEBS OF PHOTOSENSITIVE MATERIAL TO COPYING MACHINES

[75] Inventors: Erich Nagel, Anzing; Gerhard Benker, Icking, both of Germany

[73] Assignee: AGFA-Gevaert Aktiengesellschaft, Leverkusen, Germany

[21] Appl. No.: 926,921

[22] Filed: Aug. 7, 1992

[30] Foreign Application Priority Data

Aug. 13, 1991 [DE] Germany .......................... 4126752
Jun. 3, 1992 [DE] Germany .......................... 4218295

[51] Int. Cl.$^5$ .................... B65H 16/00; G03C 3/00
[52] U.S. Cl. ........................... 242/417; 242/418.1; 242/420.6; 242/564.4; 355/72
[58] Field of Search ............. 242/55, 55.53, 71, 71.1, 242/71.7; 355/28, 29, 72, 73, 74

[56] References Cited

U.S. PATENT DOCUMENTS

| | | | |
|---|---|---|---|
| 3,500,734 | 3/1970 | Lewis et al. | 355/28 |
| 3,861,610 | 1/1975 | Landis et al. | 242/55 |
| 4,066,220 | 1/1978 | Beck et al. | 242/55 |
| 4,589,605 | 5/1986 | Orii | 242/55 |
| 4,605,300 | 8/1986 | Thaddey | 355/74 X |
| 4,699,034 | 10/1987 | Sue | 242/55 X |
| 4,928,897 | 5/1990 | Satou et al. | 242/55 |
| 5,107,296 | 4/1992 | Ozawa et al. | 355/72 X |
| 5,181,066 | 1/1993 | Ozawa et al. | 355/72 X |
| 5,187,520 | 2/1993 | Müller et al. | 355/72 |
| 5,187,531 | 2/1993 | Ozawa et al. | 242/71.1 X |

*Primary Examiner*—Daniel P. Stodola
*Assistant Examiner*—John P. Darling
*Attorney, Agent, or Firm*—Darby & Darby

[57] ABSTRACT

A cassette for storage of a roll of convoluted web of photosensitive material which is to be fed to the copying station of a copying machine has a device for unwinding the web from the roll, rollers which advance selected lengths of the web into the copying station, and a mechanism which loosens or relaxes the web between the roll and the rollers so that the rollers need not overcome the inertia of the roll in order to advance selected lengths of the web from the housing of the cassette into the copying station. This can be achieved by driving the unwinding device and the rollers at different speeds so that the web forms a loop in the housing of the cassette between the outermost convolution of the roll and an outlet of the housing or by otherwise loosening the web between the roll and the outlet.

19 Claims, 5 Drawing Sheets

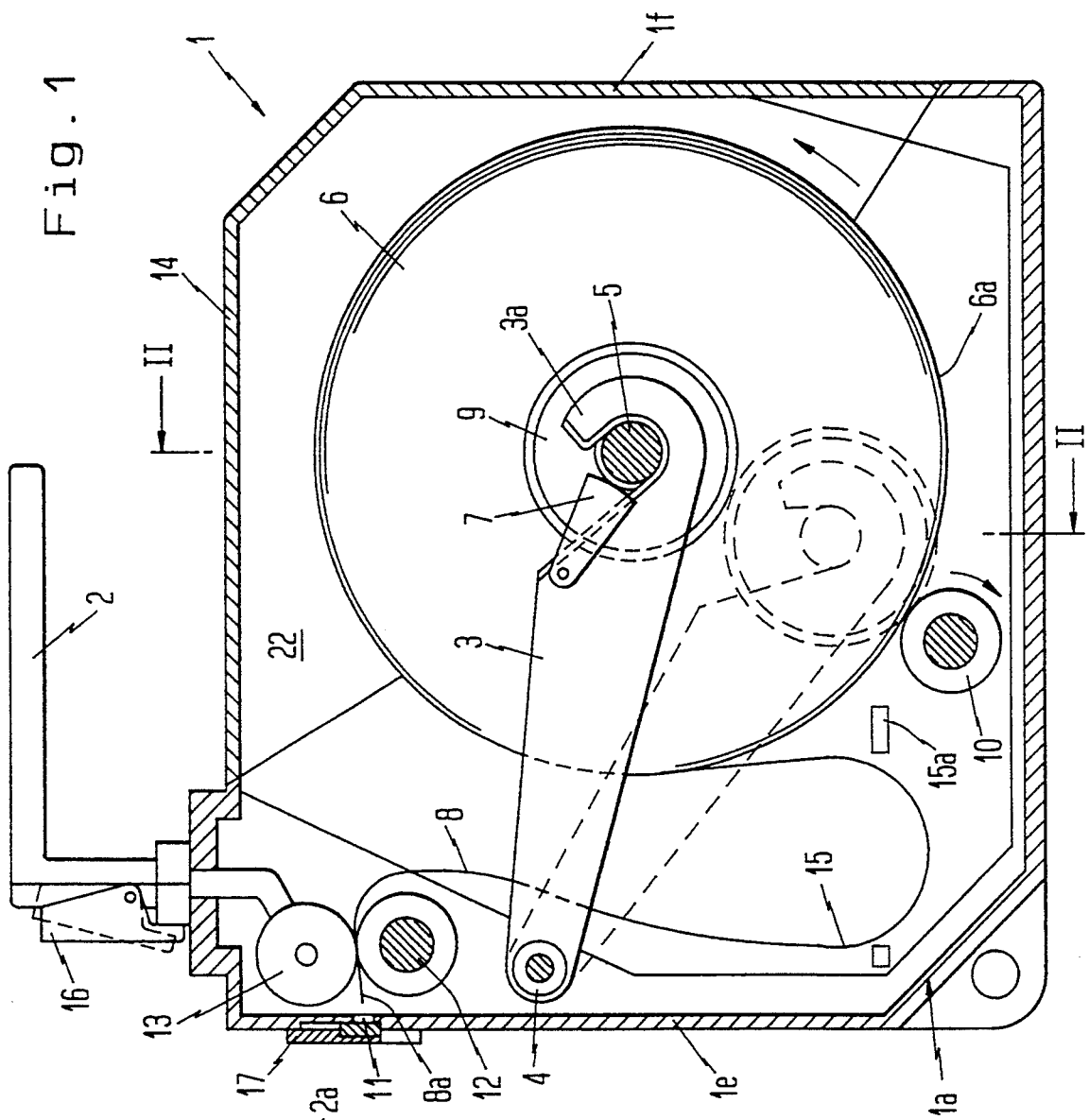
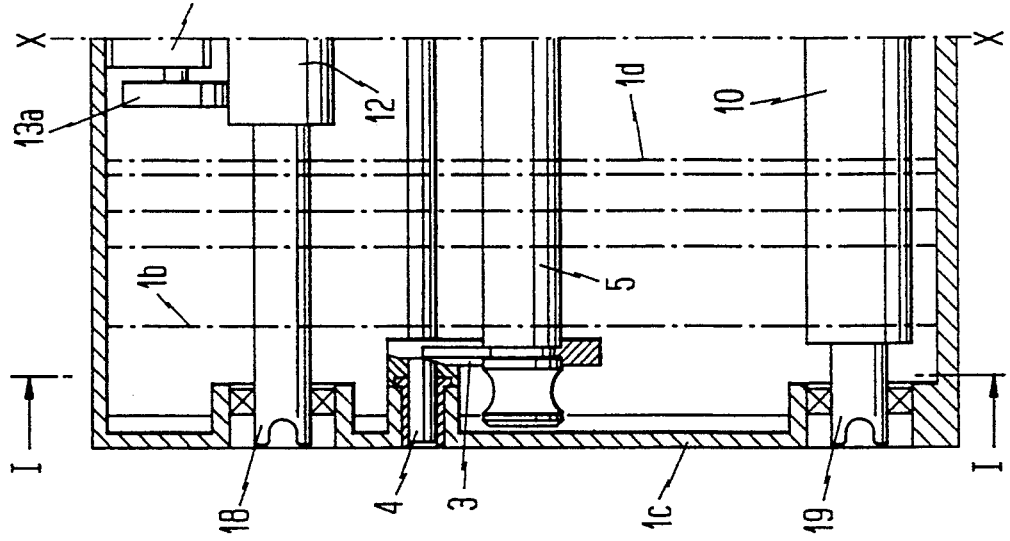

CASSETTE FOR SUPPLYING WEBS OF PHOTOSENSITIVE MATERIAL TO COPYING MACHINES

BACKGROUND OF THE INVENTION

The invention relates to containers for temporary storage of webs or strips of exposed or unexposed photographic film, photographic paper and/or other photosensitive material. More particularly, the invention relates to improvements in containers which can be used in copying and like machines for the processing of photosensitive material. The processing can involve advancement of webs or strips of photosensitive material through one or more baths, drying stations and/or copying units. The invention also relates to a method of regulating the withdrawal of webs or strips of photosensitive material from cassettes and analogous containers.

It is known to load a cassette with photographic paper or other photosensitive material in a darkroom. If the material is photographic paper, the loaded cassette is ready to be introduced into a copying machine in a photographic processing laboratory wherein the web is to advance past a copying station and to receive images of exposed and developed photographic films. As a rule, the copying machine provides room for two cassettes, one of which is to dispense unexposed photographic paper and the other of which is to collect a growing roll or package of exposed photographic paper.

It is also known to utilize cassettes with packages or rolls of photosensitive paper in so-called minilabs wherein the rewinding of exposed photographic paper onto a core or tube can be dispensed with because the freshly exposed photographic paper is immediately admitted into a developing unit to yield a series of coherent prints which are thereupon separated from each other and stuffed into envelopes (together with the corresponding exposed and developed films) for delivery or shipment to customers or dealers.

The means for transporting photographic paper in a copying machine comprises advancing means (e.g., in the form of a pair of cooperating rollers at least one of which is driven) in close or immediate proximity to the outlet (e.g., a slot) for evacuation of photographic paper from a cassette containing a package or roll of unexposed photographic paper. The advancing means draws the web or strip of photographic paper off the package or roll in a cassette and is normally operated intermittently in order to advance the web in stepwise fashion, i.e., the web is at a standstill during imaging of a film frame onto its photosensitive layer. Intermittent advancement of the web entails intermittent rotation of the roll or package of convoluted photographic paper in the cassette, and this creates problems during certain stages of withdrawal, particularly when the roll of convoluted paper is still large so that the inertia of such roll is quite pronounced. Intermittent acceleration of a large roll from zero speed and intermittent deceleration of such roll to zero speed results in the development of vibrations which, in turn, causes the web of photographic paper to slip relative to the rollers of the advancing means. Any, even minute, slippage of the web necessarily involves misalignment of photographic paper on the copying platform at the copying station of a minilab or of a larger laboratory where the freshly exposed web of photographic paper is collected in a cassette for transport into a developing machine.

Attempts to eliminate or at least reduce slippage of photographic paper in copying machines involve the provision of so-called decoupling units which are installed downstream of the outlets of cassettes containing unexposed photographic paper and include means (such as pivotable rollers) for providing the web with a loop upstream of a second advancing unit which serves to transport successive unit lengths of the web onto the copying platform. A drawback of such proposals is that the means for making a loop outside of the cassette and the second advancing means at the copying station take up a considerable amount of space which is not available in the aforediscussed minilabs, i.e., in establishments which specialize in the processing of exposed but undeveloped photographic films and in the making of prints of selected or all film frames within a short interval of time, normally 60 minutes or even less. Furthermore, the provision of looping means outside of the cassette and the provision and installation of second advancing means in the copying machine proper involve additional expenditures with attendant increase in initial and maintenance cost.

OBJECT OF THE INVENTION

An object of the invention is to provide a novel and improved container for packages or rolls of convoluted exposed or unexposed strips or webs of photosensitive material.

Another object of the invention is to provide a container which can be utilized with particular advantage for temporary storage of exposed or unexposed photographic paper in minilabs and in analogous establishments wherein film frames are imaged onto successive unit lengths of a web or strip of photographic paper.

A further object of the invention is to provide a container which is constructed and assembled in such a way that the photosensitive material is not likely to slip relative to the advancing means at any point between the package of convoluted photographic material and the copying station.

An additional object of the invention is to provide a container which can be used in a copying machine without the need for any web advancing means between the outlet of a properly installed container and the copying station.

Still another object of the invention is to provide a container which can be utilized in existing minilabs and in analogous establishments as a superior substitute for heretofore known and used containers.

A further object of the invention is to provide a novel and improved combination of a copying machine and one or more containers of the above outlined character.

Another object of the invention is to provide a container which can be rapidly converted for proper storage of rolls or packages of relatively wide or relatively narrow convoluted webs or strips of photosensitive material.

An additional object of the invention is to provide a container which can be placed into immediate proximity to the copying station in a minilab or in an analogous establishment.

Still another object of the invention is to provide a container which can be used for reception of rolls or packages of webs or strips of unexposed photosensitive material or for the building of a growing roll or package of exposed photosensitive material.

A further object of the invention is to provide a novel and improved method of regulating the withdrawal or evacuation of a web or strip of photosensitive material from a container of the above outlined character.

SUMMARY OF THE INVENTION

One feature of the present invention resides in the provision of a container or cassette (hereinafter called cassette) for storage of rolls of convoluted web- or strip-shaped photosensitive material and for dispensing of such material, particularly into a copying machine or an analogous processing unit. The improved cassette comprises an open-and-shut housing having an internal chamber, means for rotatably supporting a roll of convoluted photosensitive material in the chamber, and an outlet for evacuation of photosensitive material from the chamber. The cassette further comprises means for unwinding photosensitive material from the roll in the chamber, and means for relaxing the photosensitive material in the chamber between the roll and the outlet so that the material which leaves the housing through the outlet to enter a processing unit is free from any, or any pronounced, tensional stresses.

The unwinding means can comprise a member (e.g., a friction wheel) which directly contacts the outermost convolution of a roll in the chamber. The roll supporting means of the housing then preferably includes means (e.g., pivotable supporting arms) for maintaining the outermost convolution of a roll in the chamber in direct contact with the aforementioned member of the unwinding means under the action of gravity irrespective of the diameter of the roll.

The relaxing means can include material advancing means at the outlet of the housing. Such advancing means can be installed in the chamber closely or immediately adjacent the outlet and can comprise at least one driven rotary element at one side of the outlet and at least one second rotary element (e.g., an idler roller) at the other side of the outlet. The housing can include means (e.g., a pivotable cover) for moving the at least one second rotary element of the advancing means toward and away from the at least one driven rotary element.

A cassette wherein the relaxing means includes material advancing means at the outlet of the housing can further comprise means for generating signals in response to the development of tensional stresses in photosensitive material between the roll in the chamber and the advancing means. The relaxing means of such cassette can further comprise means (e.g., a computer) for comparing the rate of unwinding of material from the roll in the chamber with the rate of advancement of material at the outlet of the housing.

The relaxing means can comprise means for forming at least one loop of photosensitive material in the chamber between the roll and the outlet. The cassette then preferably further comprises means for monitoring the size of the loop in the chamber.

If the cassette is to be used for the storage of rolls of convoluted web-shaped photosensitive material having at least two different widths, the housing preferably comprises at least one partition and means for removably locating the at least one partition in the chamber so that the chamber can receive a roll of photosensitive material having a first width when the at least one partition is located in the chamber or is maintained in a first position in the chamber, and that the chamber can receive a roll of photosensitive material having a greater second width upon removal of the at least one partition from the chamber or upon transfer of the at least one partition to a different position in the chamber.

The arrangement may be such that the housing and at least one of the unwinding and relaxing means comprise two halves which are mirror images of each other with reference to a plane which is normal to the axis of rotation of a roll in the chamber.

In accordance with another embodiment of the present invention, the relaxing means includes means for rotating the unwinding means so that the outermost convolution of the roll in the chamber is loose (i.e., the outermost convolution is not subjected to any, or any appreciable, tensional stresses). Such cassette can further comprise manually operable means for advancing photosensitive material at the outlet of the housing, and means for fixing the housing in a predetermined position relative to a processing unit, e.g., a copying machine. The fixing means can comprise means for operating the advancing means. To this end, the fixing means can comprise an actuator (e.g., a pivotable lever) which is movable by hand from a first position to a second position to thereby fix the housing in the predetermined position and to simultaneously evacuate a preselected length of photosensitive material from the chamber through the outlet by way of the advancing means, and from the second position to the first position to thereby permit the housing to leave the predetermined position and to simultaneously return a length of material corresponding to the preselected length into the chamber through the outlet by way of the advancing means.

The housing of the just discussed cassette preferably further comprises a mouth which defines the outlet and includes two confronting sections having registering openings for elements of means for monitoring a web of photosensitive material in the path extending through the outlet.

Another feature of the invention resides in the provision of a method of feeding into a copying machine selected lengths of a web of photosensitive material from a roll of convoluted material which is confined in a cassette and is to be evacuated through an outlet in a housing of the cassette. The improved method comprises the steps of attaching the cassette to (e.g., inserting the cassette into a compartment of) the copying machine, relaxing the web between the roll and the outlet, repeatedly evacuating selected lengths of the web from the attached cassette into the copying machine so that evacuation of selected lengths does not result in tensioning of the relaxed web, and calibrating the relaxing step at least prior to first evacuation of a selected length of web from the attached cassette.

The evacuating step can comprise or can be preceded by the step of rotating the roll in the cassette in a direction to unwind the web from the roll, and the calibrating step can comprise ascertaining the angle of rotation of the roll which is required for evacuation of a selected length of the web, ascertaining the diameter of the roll, and determining on the basis of the ascertaining steps the extent of rotation of the roll which is required to unwind a length of the web which suffices to ensure that evacuation of selected lengths does not result in tensioning of the web between the roll and the outlet.

The rotating step can comprise rotating the roll to the aforementioned extent prior to each evacuating step and subsequent to the calibrating step in order to loosen the convoluted material so that the degree of relaxation of the web remains at least substantially constant.

The method preferably further comprises at least one additional calibrating step subsequent to at least one evacuation of a selected length of web from the attached cassette. Such additional calibrating step can comprise ascertaining the angle of rotation of the roll which is necessary for evacuation of a selected length of web subsequent to the at least one evacuation, ascertaining the reduced diameter of the roll subsequent to the at least one evacuation of a selected length of web, and determining on the basis of the two last mentioned ascertaining steps the extent of rotation of the roll which is necessary to unwind a length of the web which suffices to ensure that subsequent evacuation of selected lengths does not result in tensioning of the web between the roll and the outlet.

The method preferably further comprises the step of tensioning the web between the outlet and the roll (e.g., by rotating the roll in a direction to wind the web thereon) prior to the first calibrating step. This contributes to the accuracy of the first calibrating step.

The novel features which are considered as characteristic of the invention are set forth in particular in the appended claims. The improved cassette itself, however, both as to its construction and the mode of using the same, together with additional features and advantages thereof, will be best understood upon perusal of the following detailed description of certain presently preferred specific embodiments with reference to the accompanying drawing.

BRIEF DESCRIPTION OF THE DRAWING

FIG. 1 is a schematic partly elevational and partly vertical sectional view of a cassette which embodies one form of the invention and stores a fresh package of convoluted photosensitive material, the section being taken in the direction of arrows as seen from the line I—I in FIG. 2;

FIG. 2 is a fragmentary sectional view substantially as seen in the direction of arrows from the line II—II in FIG. 1, with the package of photosensitive material omitted;

DESCRIPTION OF PREFERRED EMBODIMENTS

Figure 2A:
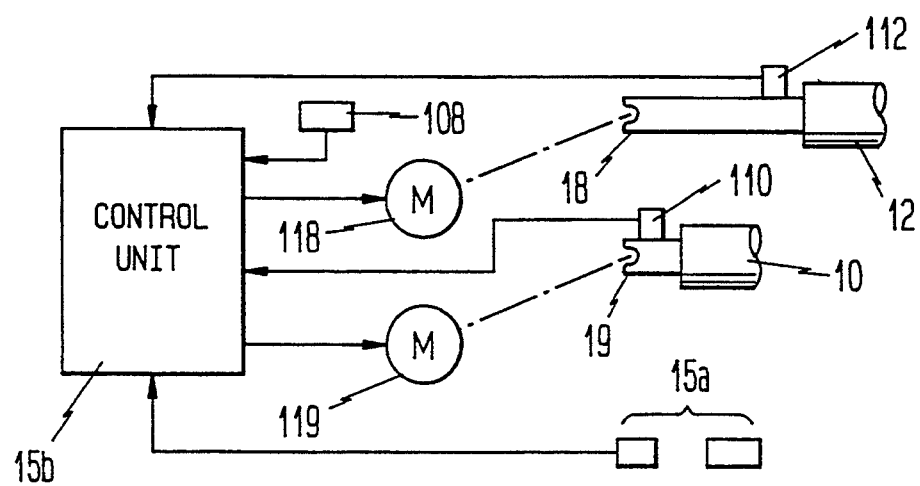
FIG. 2a is a diagrammatic view of the controls for the web unwinding and web relaxing means in a machine which employs the cassette of FIGS. 1 and 2.

Referring first to FIGS. 1 and 2, there is shown a substantially block-shaped container or cassette 1 for a package or roll 6 of convoluted web- or strip-shaped photosensitive material 8, such as unexposed photographic paper and hereinafter called web or paper web for short. The open-and-shut housing of the illustrated cassette 1 includes a main section 1a and a second section or cover 14 which is pivotably or otherwise secured to the main section 1a to define therewith a chamber 22 for the package 6, for two pivotable arms 3 (only one shown) serving as a means for supporting the package 6 in the chamber, for an elongated friction wheel 10 forming part of a means for unwinding the web 8 from the package 6, and two advancing rollers 12, 13 forming part of means for relaxing the web 8 in the chamber 22 in the region between the outermost convolution 6a of the package 6 and an elongated slit-shaped outlet 11 of the housing including the main section 1a and the cover 14. The housing is sealed against entry of light when the cover 14 is moved to the position shown in FIG. 1 and when a slidable or otherwise movable light intercepting device 17 is moved in front of the outlet 11 at the outer side of the main section 1a.

Figure 3:
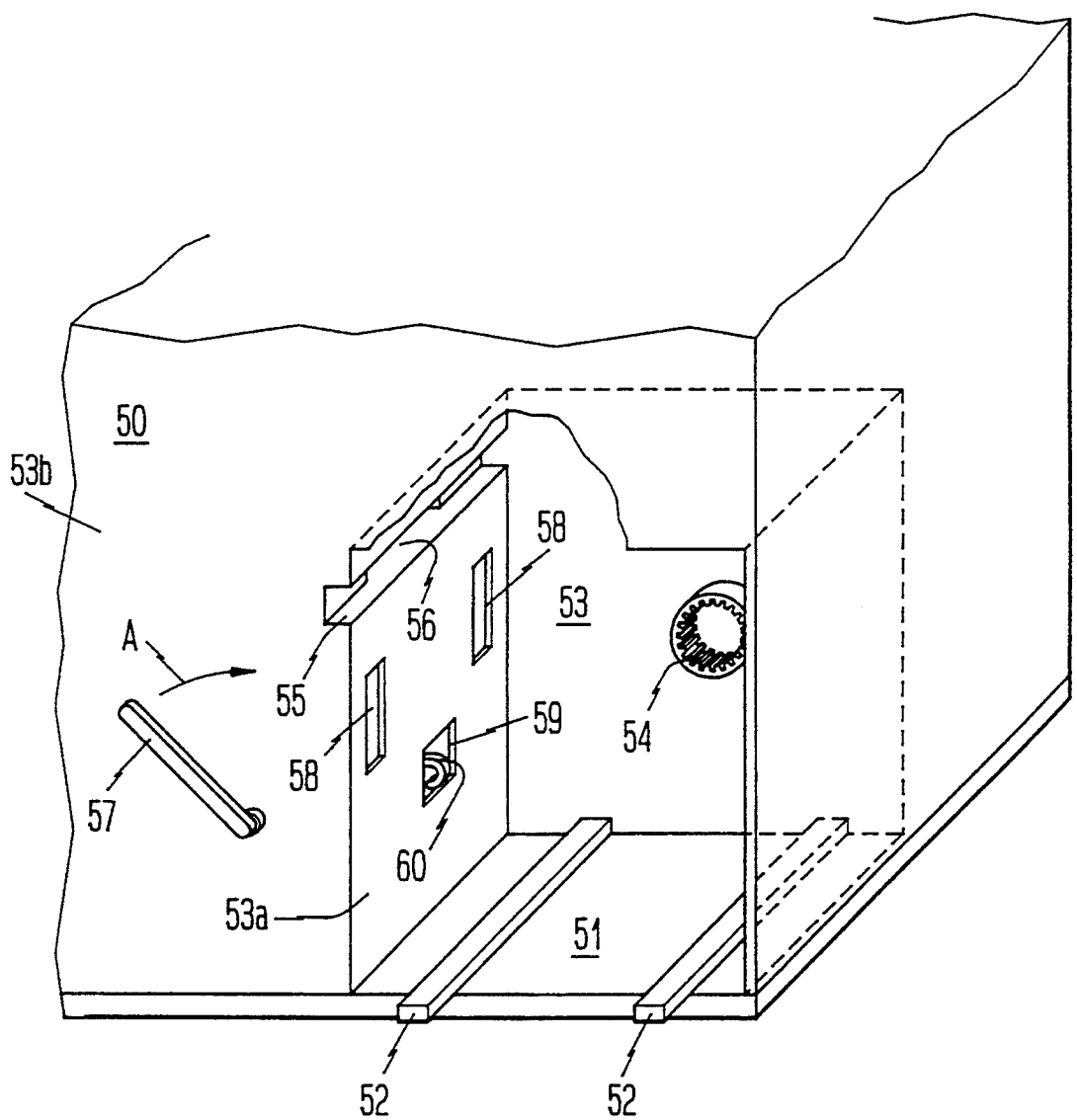
FIG. 3 is a fragmentary schematic perspective view of a copying machine with a compartment for reception of a modified container.
Figure 5:
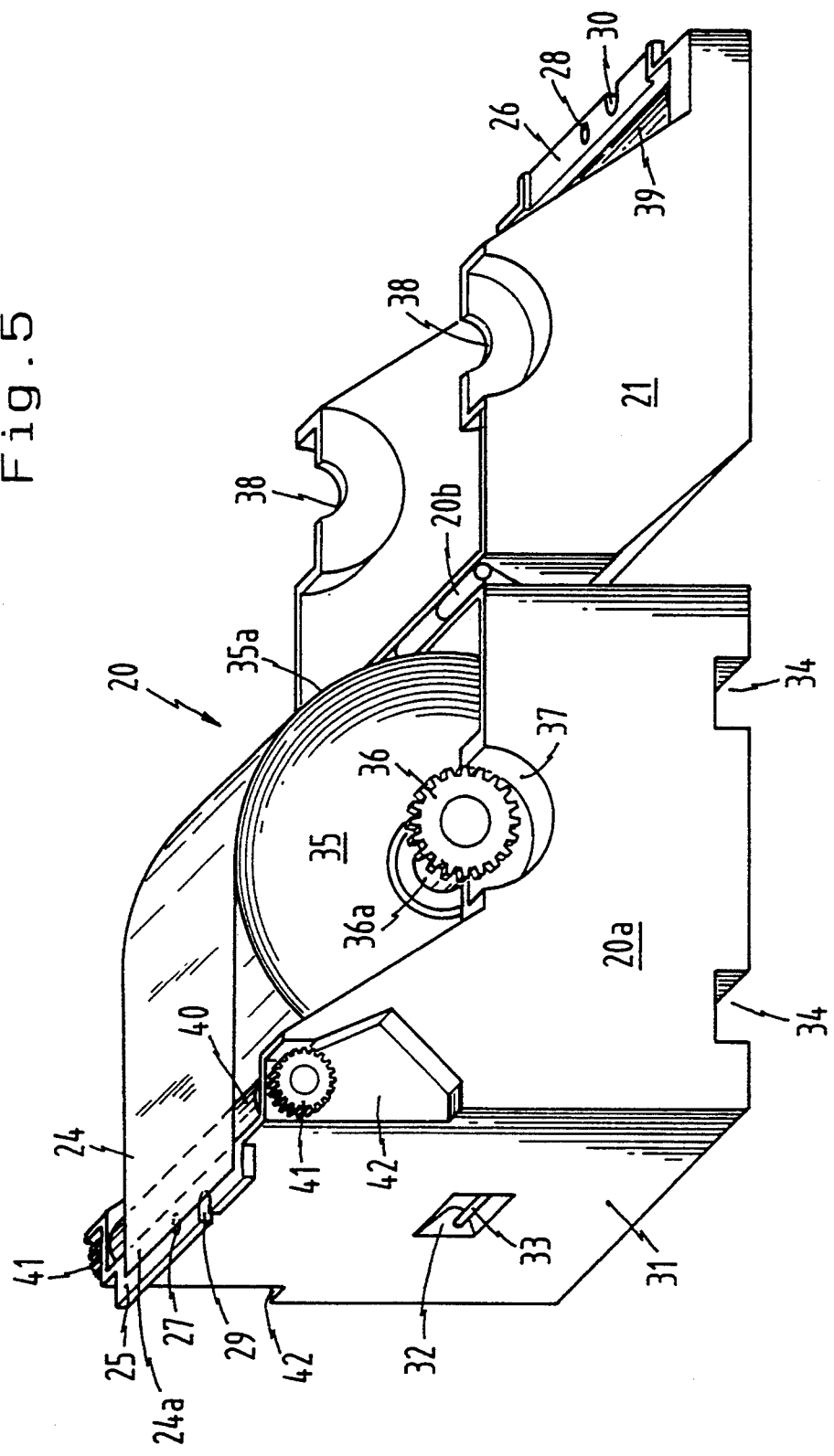
FIG. 5 is a perspective view of a cassette of the type suitable for use in the copying machine of FIG. 3, the cover of the housing of the cassette being shown in the open or inoperative position.
Figure 6:
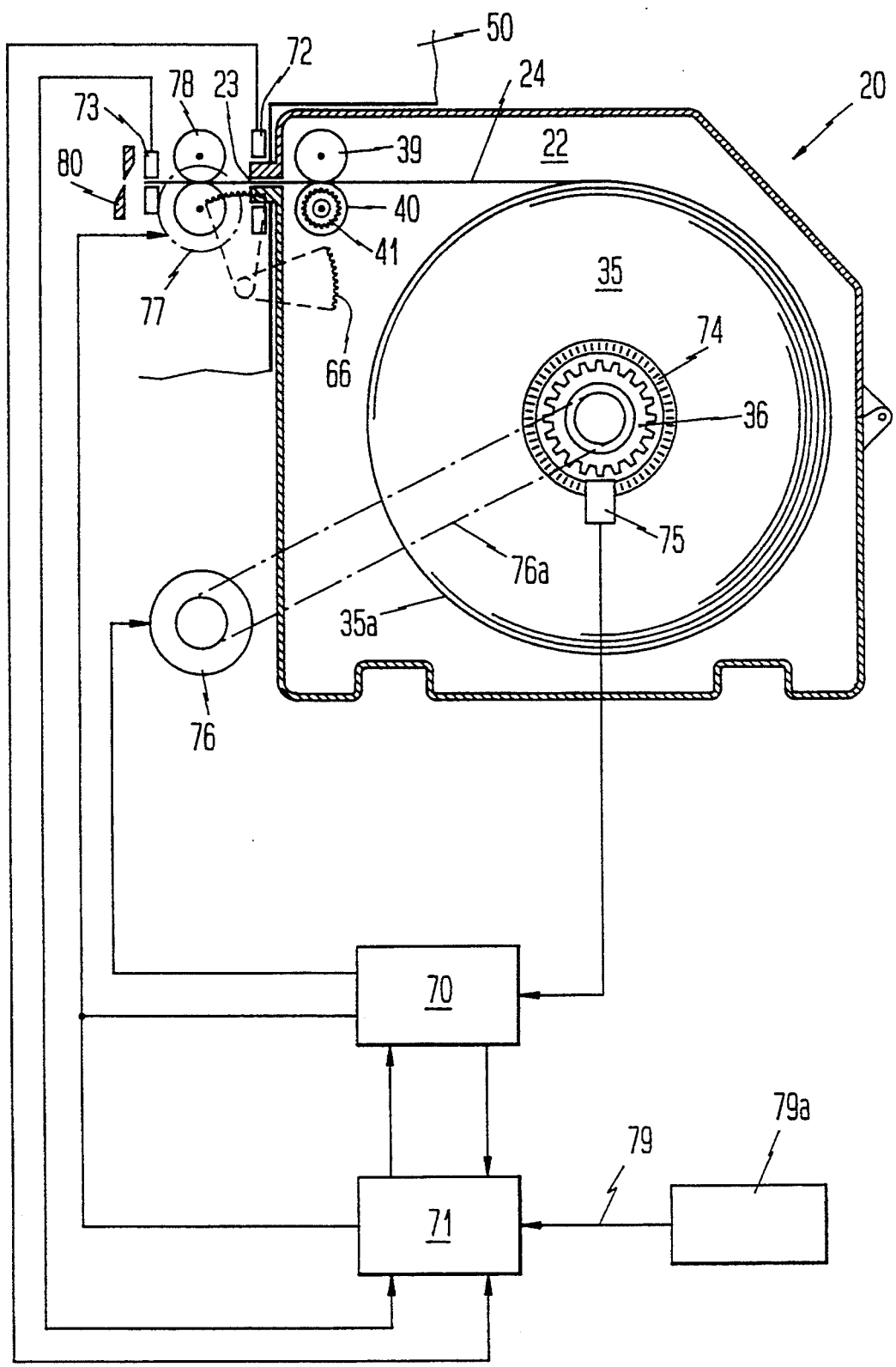
FIG. 6 illustrates the housing of the cassette of FIG. 5 in closed or shut position and in a vertical sectional view, and further showing the prime movers for the web unwinding means and certain auxiliary equipment.

The upper portion of the main housing section 1a is provided with a handle 2 for convenient transportation of the cassette 1 to and from a copying machine (such as that shown at 50 in FIG. 3 but designed to receive a modified cassette or container 20 of the type shown in FIGS. 5 and 6.

The arms 3 of the supporting means for the roll 6 are pivotable about the axis of a shaft 4 which is installed in the housing adjacent to and at a level below the outlet 11, and each of these arms has a substantially hook-shaped free end portion or socket 3a for reception of a mandrel 5 which is surrounded by a core or tube 9 for the innermost convolution of the roll 6. At least one of the arms 3 is provided with a latch or catch 7 adapted to be pivoted to and from the position of FIG. 1 in which the mandrel 5 is prevented from leaving the respective socket 3a.

In order to insert a fresh roll 6 into the housing, the cover 14 is detached from or is pivoted or otherwise moved to an inoperative position relative to the main section 1a and, depending on the width of the web 8, the main section receives one or two partitions 1b to center the inserted roll 6 between the arms 3. It is preferred to employ two partitions 1b each of which is adjacent one of the two sidewalls 1c of the main section 1a. The latter is provided with internal guide grooves 1d for reception of marginal portions of inserted partitions 1b. Each partition 1b can constitute a sheet or plate consisting, for example, of a metallic or plastic material. Insertion of the roll 6 into the main section 1a of the housing takes place in a darkroom, not shown. It is clear that the latch or catch 7 is pivoted to inoperative position prior to insertion of the end portions of a mandrel 5 into the respective sockets 3a. Since the arms 3 are free to pivot about the axis of the shaft 4, they maintain the outermost convolution 6a of a properly inserted roll 6 in direct contact with the peripheral surface of the friction wheel 10 under the action of gravity because a properly loaded cassette 1 is inserted into the suitably configurated compartment 51 (FIG. 3) of the copying machine in such a way that the shaft 4 is located at a level above the friction wheel 10 so that the latter is invariably engaged by the outermost convolution 6a irrespective of the diameter of the roll 6.

The leader 8a of the web 8 is unwound from the roll 6 before or after the latter is inserted into the main section 1a of the housing so that the web forms a loop 15 between the outermost convolution 6a and the advancing rollers 12, 13 and the leader 8a can be inserted into the nip of the advancing rollers 12, 13 to be still within the chamber 22 but closely or immediately adjacent the outlet 11 (which is sealed by the member 17).

The handle 2 can be pivoted through approximately 45 degrees in response to depression of a locking pawl 16 from the solid-line position to the broken-line position of FIG. 1. When the pivoting of the handle 2 is completed, the latter can be lifted above the position of FIG. 1 to move the advancing roller 13 above and away from the advancing roller 12. The advancing roller 13 can comprise two or more relatively narrow friction wheels 13a one of which is shown in FIG. 2 and which are connected to the handle 2 by a coupling member 2a. The handle 2 is thereupon turned through another 45° to assume a locked position in which it remains during insertion of the leader 8a of the web 8 into the (enlarged or widened) nip of the rollers 12, 13. The handle 2 is thereupon pivoted or turned in the opposite direction, first through 45° so that it can be lowered to the level of FIG. 1, and thereupon again through 45 degrees to be locked in the position of FIG. 1 in which the leader 8a is properly engaged (clamped or pinched) between the advancing rollers 12 and 13.

The leader 8a need not extend from the housing of the cassette 1 when it is properly pinched between the advancing rollers 12, 13. Therefore, the light intercepting device 17 (e.g., a slide which is reciprocable along the outer side of the main housing section 1a) can remain in the operative position of FIG. 1. This slide 17 can be automatically shifted out of the way in response to insertion of the properly loaded cassette 1 into the single compartment or into one of several compartments of a copying machine. This ensures that the outlet 11 is exposed and can permit the web 8 to pass therethrough only at a time when the copying machine (rather than the slide 17) prevents penetration of light into the chamber 22 through the outlet 11. Proper insertion of the loaded cassette 1 into a copying machine results in automatic engagement of coupling elements 18, 19 at the ends of the driven advancing roller 12 and the friction wheel 10 with complementary torque-transmitting coupling elements (not shown) in the casing of the copying machine so that the friction wheel 10 can be rotated in a direction (indicated by arrow) to unwind the web 8 from the roll 6 and the advancing roller 12 can be rotated in a direction (indicated by arrow) to advance the leader 8a through and outwardly beyond the outlet 11, particularly onto the copying platform of the copying machine.

The loop 15 is formed as a result of driving the friction wheel 10 and the lower advancing roller 12 at appropriate speeds. FIG. 1 shows a loop 15 which is formed by gravity in that the web portion between the outermost convolution 6a and the nip of the rollers 12, 13 sags under the action of gravity. However, it is equally possible to enhance the formation of a loop 15 having a desired shape by employing one or more so-called dancer rollers (not specifically shown) which are carried by the cover 14 and are caused to rest on the concave internal surface of the loop 15 when the cover 14 is moved back to the position of FIG. 1.

The illustrated cassette 1 comprises two halves which are mirror images of each other with reference to a plane X—X which is normal to the axis of rotation of the mandrel 5 (and roll 6). This renders it possible to employ the cassette 1 as a means for storing a roll 6 of unexposed web 8 or as a means for collecting and storing a web of exposed photographic paper or other photosensitive material. Cassettes of the type disclosed in the present application can be utilized, for example, in apparatus disclosed in commonly owned copending patent application Ser. No. 922,051 (now U.S. Pat. No. 5,257,065 filed Jul. 29, 1992 by Nagel for "Apparatus for transporting exposed photographic films through and beyond a developing unit" and in commonly owned copending patent application Ser. No. 922,049 filed Jul. 29, 1992 by Wilhelm Nitsch et al for "Apparatus for making prints of exposed and developed photographic films".

An important advantage of the improved cassette 1 is that the web 8 is loosened or relaxed in the interior of the housing so that the advancing rollers 12, 13 which are called upon to withdraw selected lengths of the web from the housing need not overcome the inertia of the relatively large and bulky roll 6. This not only entails considerable savings in space, especially at the copying station of the machine 50, but also ensures that no additional undertakings must be carried out in order to ensure predictable advancement of requisite lengths of the web 8 onto the platform at the copying station. The prime mover 118 need not rotate the roll 6 but only the rollers 12, 13 which, in turn, must accelerate or decelerate only a relatively short untensioned portion of the web. Loosening of the web 8 in the region of the outermost convolution 6a of the roll 6 is ensured by the friction wheel 10. The cassette 1 exhibits the additional advantage that even a member (friction wheel 10) of the means for unwinding the web 8 from the roll 6 is confined in the housing including the main section 1a and the cover 14. All that is necessary is to establish a torque transmitting connection between the prime mover 118 and the coupling element 19 when the cassette 1 is properly inserted into the compartment of the copying machine. The feature that the friction wheel 10 is installed in the housing of the cassette 1 exhibits the additional advantage that, due to the provision of the pivotable supporting arms 3, the outermost convolution 6a of the roll 6 is maintained in direct contact with the peripheral surface of the friction wheel 10 under the action of gravity irrespective of the diameter of the roll. The same result can be achieved if the pivotable supporting arms 3 are replaced by supporting means (not shown) which are movable up and down along suitable guide means at the inner sides of the sidewalls 1c of the housing section 1c of FIG. 2. All that counts is to ensure that the selected supporting means enable the roll 6 to descend by gravity at a rate which is proportional with the reduction of its diameter in response to repeated extraction of selected lengths of the web 8 through the outlet 11 of the housing section 1a.

The cassette 1 exhibits the additional advantage that the advancing rollers 12, 13 which cause the leader of the web 8 to enter the actual copying station are also confined in the housing including the main section 1a and the cover 14. This further reduces the space requirements of the web advancing means in the interior of the casing of the copying machine which must merely confine or support the prime mover 118 for the coupling element 18 of the driven advancing roller 12. Furthermore, the leader 8a of the web 8 remains confined in the chamber 22 of the cassette 1 and the outlet 11 can be sealed by the slide 17 before the cassette is actually introduced into the copying machine. This ensures highly reliable sealing of the inlet 11 against penetration of light into the chamber 22 of the cassette 1 before the cassette is inserted into the single compartment or into one of several compartments in a copying machine. In heretofore known cassettes, the leader of the web must be accessible in order to permit threading of the web into the copying machine.

The guide groove or grooves $1d$ need not be provided in each and every wall of the housing section $1a$. It normally suffices to provide such guide groove or grooves in the walls $1e$ and $1f$ of the main housing section $1a$. The wall $1e$ is provided with the outlet 11 and the wall $1f$ is located opposite the wall $1e$. The partition or partitions $1b$ can be introduced into selected grooves $1d$ outside of a darkroom, i.e., prior to introduction of a fresh roll 6 into the chamber 22.

One presently preferred mode of regulating the unwinding of the web 8 from the roll 6 and of evacuating selected lengths of the web from the housing through the outlet 11 is shown schematically in FIG. 2a. The coupling element 18 of the driven advancing roller 12 can receive torque from a first prime mover 118, and the coupling element 19 of the friction wheel 10 can receive torque from a second prime mover 119. The prime mover 118 intermittently rotates the roller 12 at a first speed, and the prime mover 119 intermittently rotates the friction wheel 10 at a lesser second speed. The prime movers 118, 119 can be installed in the copying machine 50. The arrangement may be such that, during each operating cycle, i.e., during each rotation of the coupling elements 118, 119, the advancing rollers 12, 13 cooperate to advance a certain increment of the web 8, such increment having a length $\underline{f}$, and the friction wheel 10 rotates the roll 6 through an angle to unwind an increment having a length $f-\underline{g}$ wherein $g=1$ mm. Moreover, the prime mover 118 is designed to abruptly accelerate the rollers 12, 13 from zero speed to a predetermined maximum speed; this does not present any problems since the inertia of the loop 15 (from which the rollers 12, 13 draw an increment having the length $\underline{f}$) is practically nil. Acceleration of the rollers 12, 13 should take place in synchronism with the operation of the copying machine, and the prime mover 118 should be capable of instantaneously decelerating the roller 112 to zero speed preparatory to start of a copying operation during which a length of unexposed photographic paper (web 8) overlies the copying platform. Reference may be had again to the aforementioned commonly owned copending patent applications. Abrupt deceleration of the rollers 12, 13 and of the web 8 between them presents no problems for the same reason as abrupt acceleration because the rollers 12, 13 need not brake the entire roll 6 but only the relatively short portion of the web 8 between them.

On the other hand, the prime mover 119 is designed to gradually accelerate and to thereupon gradually decelerate the friction wheel 10 and hence the roll 6. This reduces the likelihood of slippage of the peripheral surface of the friction wheel 10 relative to the outermost convolution $6a$ of the roll 6 and/or vice versa. When the size of the loop 15 is reduced to a predetermined extent (due to the difference between the lengths f and $f-g$, a photoelectronic detector $15a$ or another suitable monitoring device transmits a signal to the corresponding input of a control unit $15b$ (e.g., a unit including a computer) for the prime mover 119. The latter then causes the friction wheel 10 to enlarge the size of the loop 15, for example, by causing the friction wheel to advance a longer increment (e.g., $2f-2g$) of the web 8 in response to next starting of the prime mover 119. This results in appropriate increase of the size of the loop 15 and the detector $15a$ ceases to transmit a signal until after the size of the loop 15 is again reduced to a predetermined minimum acceptable value. The same procedure is repeated again and again, as often as necessary, in order to ensure that the size of the loop 15 can fluctuate only within a preselected range of acceptable values. Furthermore, such mode of unwinding the web 8 from the roll 6 and of evacuating the web through the outlet 11 ensures that the likelihood of delivering too long or too short increments of the web 8 onto the copying platform is practically nil. The detector $15a$ can operate with a source of infrared light.

The control unit $15b$ cooperates with the detector $15a$ to compare the rate of unwinding of the web 8 from the roll 6 in the chamber 22 with the rate of advancement of the web 8 by the rollers 12, 13 through the outlet 11.

FIG. 2a further shows that the unwinding of the web 8 from the roll 6 and the evacuation of web through the outlet 11 can be effected by a different second system which can be used as a backup system for the system including the detector $15a$. This second system employs a tachometer generator 112 which monitors the RPM of the advancing roller 12 and hence the length of that increment (f) of the web 8 which is evacuated from the cassette 1 through the outlet 11. The tachometer generator 118 transmits an appropriate signal to the control unit $15b$ (or to an equivalent control unit) which also receives signals from a tachometer generator 110 indicating the RPM of the friction wheel 10. The control unit $15b$ processes the signals from the tachometer generators 112, 110 and transmits appropriate signals to the prime mover 119 so that the friction wheel 10 is driven in the aforedescribed manner, namely to undergo gradual acceleration followed by gradual deceleration and to be driven for an interval of time which suffices to ensure that the size of the loop 15 remains within an acceptable range.

The web unwinding and evacuating operations can be interrupted in response to signals from a further detector 108 which can be positioned in such a way that it detects actual tensioning of the web 8 between the outermost convolution $6a$ of the roll 6 and the nip of the advancing rollers 12, 13. A signal from the detector 108 to the control unit $15b$ causes the latter to arrest the prime mover 118 and/or to repeatedly operate the prime mover 119 in order to reestablish a loop 15 of acceptable size.

The three described systems for regulating the operation of the prime movers 118, 119 can be used jointly or individually.

The detector $15a$ can constitute one of two or more suitably distributed detectors which monitor the size of the loop 15 and transmit to the control unit $15b$ appropriate signals which are processed to ensure that the rate of unwinding of the web 8 from the roll 6 suffices to avoid tensioning of the web between the outermost convolution $6a$ and the nip of the advancing rollers 12, 13. The detector or detectors $15a$ can be designed to serve an additional purpose, namely to transmit to the control unit $15b$ signals which are processed to indicate whether or not the size of the loop 15 is on the increase rather than on the decrease. If the size of the loop 15 is on the increase, i.e., if the unit lengths of the web 8 which are being unwound from the roll 6 are greater than the unit lengths which are advanced by the rollers 12, 13 into the copying station, the means for relaxing the web 8 must be adjusted accordingly. The arrangement is preferably such that the size of the loop 15 decreases stepwise when the roll 6 is exhausted, i.e., when the loop 15 constitutes the only remaining supply of web 8 in the cassette 1.

FIGS. 3 to 6 illustrate a second cassette 20 which can be utilized in the copying machine 50. The cassette 20 comprises a housing including a main section 20a and a second section or cover 21 which is articulately connected to the main section 20a by a hinge 20b. When the housing is shut, i.e., when the cover 21 is pivoted to the position of FIG. 6, the sections 20a, 21 define a chamber 22 which is sealed against entry of light and can receive a roll or package 35 consisting of a web or strip 24 of convoluted photosensitive material, e.g., unexposed photographic paper. The main section 20a of the housing has an outlet 23 for the web 24, and such outlet is defined by a mouth having a lower section 25 on the front end wall 31 of the main section 20a and a second section 26 on the cover 21. The sections 25, 26 of the mouth are provided with substantially centrally located openings 27, 28, respectively, which are in register with each other when the cover 21 is pivoted to the position of FIG. 6. A photoelectronic detector 72 (FIG. 6) in the copying machine 50 is positioned to monitor the openings 27, 28 in order to generate signals which denote the presence or absence of the web 24 in the outlet 23.

The opening 27 is adjacent a window or notch 29 in the lower section 25, and the opening 28 is adjacent a window or notch 30 in the upper section 26 of the mouth which defines the outlet 23. The windows 29, 30 register when the cover 21 is moved to the position of FIG. 6 and permit visual determination of the presence or absence of the web 24 in the outlet 23.

Figure 4A:
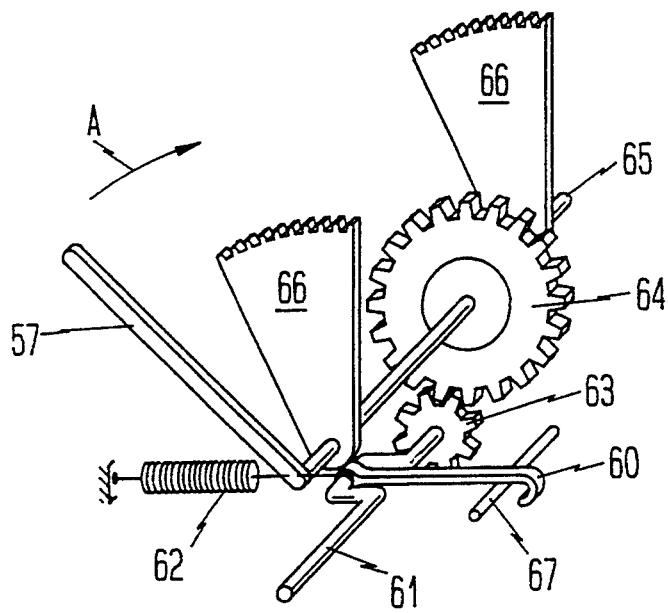
FIG. 4a is a perspective view of a mechanism which can be utilized in the copying machine of FIG. 3 to releasably fix a cassette in the compartment of FIG. 3.
Figure 4B:
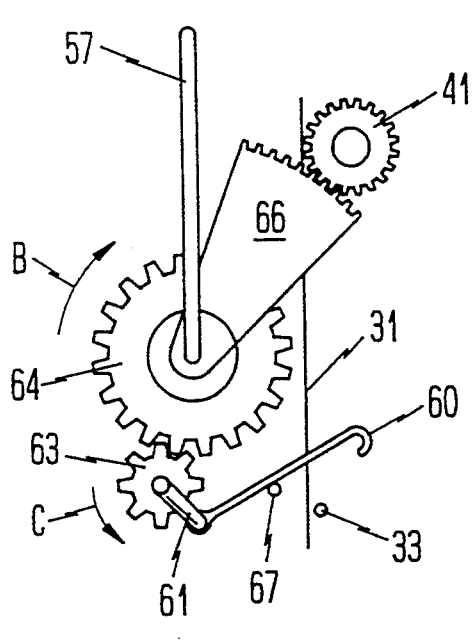
FIG. 4b is a front elevational view of the mechanism, with its actuator in a different position.
Figure 4C:
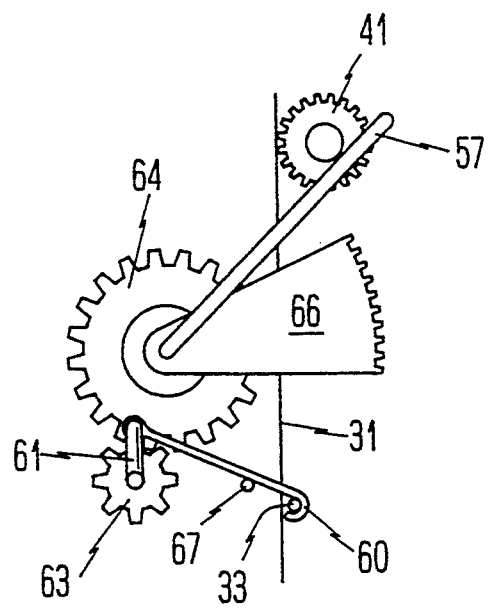
FIG. 4c illustrates the structure of FIG. 4b but with the actuator in still another position.

The front end wall 31 of the main housing section 20a is provided with a recess 32 for a locking pin 33, and the bottom wall of the section 20a is provided with two parallel guide channels or grooves 34 which serve to receive guide rails 52 in the compartment 51 of the copying machine 50 of FIG. 3 to ensure predictable introduction of the cassette 20 into the compartment 51. When the cassette 20 reaches a predetermined position within the compartment 51, it can be locked in such position by a hook-shaped pawl 60 which is shown in FIGS. 4a to 4c and can be caused to engage the locking pin 33 in the recess 32.

The outermost convolution of the roll 35 is shown at 35a, and the innermost convolution of this roll surrounds a core 36a each end portion of which carries a gear 36 forming part of the means for unwinding the web 24. The bearings for the end portions of the core 36a of the roll 35 in the chamber 22 include lower portions 37 in the respective sidewalls of the main housing section 20a and upper portions 38 in the sidewalls of the cover 21. The bearing portions 37, 38 have recesses for the respective gears 36 so that such gears need not extend beyond the outer sides of the sidewalls of the main section 20a and cover 21.

The means for advancing the web 24 through the outlet 23 comprises a pair of rollers 39, 40 which are inwardly adjacent the front end wall 31 of the main section 20a. The driven lower advancing roller 40 is installed in the main section 20a, and the upper advancing roller 39 is installed in the cover 21. The end portions of the shaft of the lower advancing roller 40 carry gears 41 which can be operated by hand to rotate the roller 39 in a direction to advance the leader of the web 24 from the chamber 22 by way of the outlet 23. The gears 41 are accessible to the fingers of an operator by being confined in recesses 42 which are provided therefor in the respective sidewalls of the main housing section 20a. In accordance with a presently preferred embodiment, the gears 41 are made of an elastomeric plastic material and are positioned in the respective recesses 42 in such a way that they can be manipulated or operated by a person in charge of introducing the cassette 20 into the compartment 51 of the copying machine 50 or that they can be rotated by gear segments 66 which are shown in FIGS. 4a to 4c and in FIG. 6 and are installed in the casing of the copying machine 50.

The copying machine 50 of FIG. 3 comprises the aforementioned compartment 51 with guide rails 52 which extend into the grooves 34 of the main housing section 20a during introduction of the cassette 20 into the compartment 51 as well as after the cassette reaches the aforementioned predetermined (fully inserted) position in the copying machine. The rear wall 53 of the casing of the copying machine 50 carries a sleeve-like internal gear 54 which meshes with one of the gears 36 when a cassette 20 is properly inserted into the compartment 51, and the internal gear 54 can be driven by a stepping motor 76 (FIG. 6) which is installed in or on the casing of the copying machine 50.

The internal wall 53a of the casing of the copying machine 50 is provided with an elongated recess 55 which receives the sections 25, 26 of the mouth on the main housing section 20a of the properly inserted cassette 20. The recess 55 communicates with an elongated slot 56 which admits the web 24 into the copying station of the machine 50 in response to rotation of the advancing rollers 39, 40 in directions to evacuate the web 24 from the chamber 22 of the cassette 20. The internal wall 53a is further provided with an aperture 59 for the locking pawl 60 and with two apertures 58 for the gear segments 66.

The fixing mechanism which transmit motion to the gear segments 66 and to the locking pawl 60 is installed in the casing of the copying machine 50. Such fixing mechanism comprises a crankshaft 61 whose crank is articulately connected to the locking pawl 60 (see FIGS. 4a to 4c). A coil spring 62 or an equivalent biasing device is provided in the casing of the machine 50 to urge the crankshaft 61 to the angular position of FIG. 4a. The crankshaft 61 carries a gear 63 which mates with a larger gear 64 on a shaft 65 for an actuator 57 in the form of a lever pivotable in and counter to the direction indicated by arrow A and located in front of a front wall 53b of the casing of the copying machine. The gear segments 66 are non-rotatably secured to the shaft 65. An intermediate portion of the locking pawl 60 rests on and is guided by a rod 67.

The means for relaxing the web 24 between the outermost convolution 35a of the roll 35 in the chamber 22 and the outlet 23 includes a counter 70 (FIG. 6) which transmits signals to the stepping motor 76 for the internal gear 54 and receives signals from a sensor 75 as well as from a computer 71. The aforementioned photosensitive detector 72 which monitors the outlet 23 for the presence or absence of the web 24 between the openings 27, 28 of the mouth sections 25, 26 transmits signals to the corresponding input of the computer 71, and another input of this computer receives signals from a photoelectronic detector 73 which monitors a path for the web 24 between the outlet 23 of the properly inserted cassette 20 and a trimming or severing device 80 in the casing of the copying machine 50. The reference character 74 denotes in FIG. 6 an encoded disc 74 which rotates with the internal gear 54 and whose angular position is monitored by the sensor 75.

The transmission 76a between the output element of the stepping motor 76 on the one hand, and the internal gear 54 and disc 74 on the other hand, can comprise a toothed endless belt conveyor. A second stepping motor 77 is provided in the casing of the copying machine 50 to drive advancing rollers 78 which are outwardly adjacent the outlet 23 of the housing of a cassette 20 which is properly installed in the compartment 51 of the machine 50.

A person in charge of loading the housing of a cassette 20 proceeds as follows:

The cover 21 is pivoted to the open position of FIG. 5 so that the end portions of the core 36a of a fresh reel 35 can be introduced into the corresponding bearing portions 37 in the sidewalls of the main housing section 20a. The leader 24a of the web 24 is pulled by hand to a position beyond the lower section 25 of the mouth which defines the outlet 23, and the cover 21 is thereupon pivoted to the closed or sealing position of FIG. 6 in which the roll 35 in the chamber 22 is shielded from light at the exterior of the shut housing including the main section 20a and cover 21. The operator then rotates one or both gears 41 by hand in order to retract the leader 24a toward the advancing rollers 39, 40 so that the leader 24a no longer extends beyond the sections 25, 26 of the mouth but is still visible in the notches 29 and 30.

The cassette 20 is then ready for introduction into the compartment 51 and for fixing to the copying machine 50, and such introduction is facilitated by the guide rails 52 which enter the corresponding grooves 34 in the bottom wall of the cassette 20. As can be seen in FIG. 3, the front end portions of the guide rails 52 extend from the compartment 51 to facilitate the positioning of the cassette 20 in such a way that the rear ends of the grooves 34 receive such front end portions of the respective guide rails. The front portion of the cassette 20 is then lifted and the cassette is simply pushed into the compartment 51 until it reaches the predetermined (properly inserted) position in which the rear gear 36 on the core 36a of the roll 35 in the cassette meshes with the internal gear 54 of the web unwinding means.

During insertion of the cassette 20 into the compartment 51 of the copying machine 50, the actuator lever 57 is held in the (first) angular position of FIG. 4a. The operator then pivots the actuator 57 in the direction of arrow A toward the (second) position of FIG. 4c in which the actuator is located in front of the compartment 51 and of the front sidewalls of the sections 20a, 21 so that the operator can actually see that the cassette is locked in the copying machine 50. When the actuator 57 is pivoted in the direction of arrow A, the shaft 65 rotates the gear segments 66 and the gear 64 in the direction of arrow B. The gear 64 rotates the gear 63 and the crankshaft 61 in the direction of arrow C. The pallet of the locking pawl 60 moves from the inoperative position of FIG. 4a, through the intermediate position of FIG. 4b and to the operative position of FIG. 4c in which it engages and holds the pin 33 which is confined in the recess 32 in the front end wall 31 of the housing of the cassette 20 in the compartment 51. The last stage of pivoting of the actuator 57 to the second position of FIG. 4c entails the exertion of a pull upon the locking pin 33 in a direction to the left, as viewed in FIGS. 3, 4c and 5, so that the sections 25, 26 of the mouth on the main housing section 20a are caused to penetrate into the recess 55 so as to seal the slot 56 in the front end wall 53a against penetration of light into the housing of the cassette 20 in the compartment 51.

The spring 62 opposes the initial stage of pivotal movement of the actuator 57 from the position of FIG. 4a toward the position of FIG. 4c. However, the spring 62 thereupon either assists or actually causes the additional pivotal movement of the actuator 57 all the way to the position of FIG. 4c. As can be seen in FIGS. 4a to 4c, pivoting of the gear 63 through an angle of approximately 270° necessitates a pivoting of the actuator 57 through an angle of approximately 100°. The locking pawl 60 is caused to advance from the interior of the casing of the copying machine 50, through the aperture 59 in the internal wall 53a and into the compartment 51 to engage the locking pin 53 in the recess 32 in response to pivoting of the actuator 57 to the position of FIG. 4c. At such time, the gear segments 66 are pivoted into the compartment 51 through the respective apertures 58 of the front end wall 53a to temporarily mate with the respective gears 41 and to thus rotate the advancing roller 40 in a direction to feed the leader 24a of the web 24 into the copying machine 50, i.e., into the nip of additional advancing rollers 78. The gear segments 66 are disengaged from, by advancing beyond, the respective gears 41 when the actuator 57 reaches the position of FIG. 4c. The dimensions of the gear segments 66 are selected in such a way that the leader 24a of the web 24 is located in the nip of the advancing rollers 78 when the toothed portions of the segments 66 advance beyond the respective gears 41 as a result of further pivoting of the actuator 57 toward the end position of FIG. 4c. The actuator 57 is then releasably held in such end position by the spring 62.

The stepping motor 77 begins to rotate the advancing rolls 78 in a direction to feed the leader 24a toward the trimming device 80 as soon as the detector 72 transmits to the computer 71 a signal denoting the presence of the web 24 between the emitter and the receiver of the detector 72. The motor 77 is arrested in response to a signal from the computer 71 as soon as the latter receives a signal from the detector 73, i.e., as soon as the leader 24a of the web 24 has advanced toward or all the way into the range of the trimming device 80. The purpose of the trimming device 80 is described in the aforementioned commonly owned copending patent applications.

A suitable terminal 79a (e.g., a keyboard) is thereupon caused to transmit to the computer 71 (via conductor 79) a signal denoting the desired format of the prints to be obtained from the web 24 as a result of imaging of film frames onto the web at the copying station of the machine 50. The computer 71 processes such signal to ensure that the motors 76 and 77 receive a requisite number of impulses for proper advancement of the web 24 into the copying station.

The advancing rolls 78 have advanced the leader 24a of the web 24 through a predetermined distance into the range of the trimming device 80. This constitutes the start of a calibrating operation the first step of which is preceded by starting the stepping motor 76 in response to a signal from the computer 71 via counter 70 so that the roll 35 is rotated in a clockwise direction (as viewed in FIG. 6) and the web 24 is convoluted onto the roll 35. This results in tensioning of the web 24 between the outermost convolution 35a of the roll 35 and the nip of the advancing rollers 78. The counter 70 thereupon starts the motor 77 so that the web 24 is advanced a distance corresponding to one selected picture format and at a relatively low speed into the copying station of the machine 50. At the same time, the sensor 75 monitors the disc 74 which rotates with the roll 35 and this sensor transmits appropriate signals to the counter 70 to indicate the extent of rotation of the roll 35 which is necessary to unwind a selected length of the web 24.

In order to avoid the need to rotate the roll 35 and the output element of the motor 76 as a result of rotation of the advancing rollers 78 by the motor 77 in the course of the calibrating operation, the calibrating operation can be carried out in a different way as follows: When the insertion of the cassette 20 into the compartment 51 is completed, the motor 76 is started in a sense to loosen the web 24 to an extent which suffices for the calibrating and threading-in operation regardless of the diameter of the roll 35. The motor 77 is started in response to locking of the cassette 20 by the pawl 60 so that the rollers 78 advance the leader 24a of the web 24 until the leader 24a reaches the detector 73 which transmits a signal to the computer 71. The latter causes the motor 77 to continue to drive the rollers 78 by a predetermined number of steps corresponding to a preselected length W of the web 24. The motor 77 is thereupon arrested and the motor 76 is started in a direction to wind the web 24 onto the roll 35. When the slack in the web 24 between the advancing rolls 78 and the outermost convolution 35a of the roll 35 is eliminated, the motor 76 causes the tightened roll 35 to draw the leader 24a of the web 24 toward the chamber 22 of the cassette 20 in the compartment 51. This causes the advancing rollers 78 to rotate under the action of the web 24, i.e., to rotate in a direction counter to that which is necessary to draw the web from the chamber 22. The stepping motor 77 then acts not unlike a pulse generator and transmits signals to the computer 71. The motor 76 is arrested when the retraction of the web 24 into the chamber 22 through the aforementioned distance (length W) is completed, i.e., when the counter 70 has completed the transmission of a predetermined number of pulses to the computer 71. The counter 70 counts the pulses which are transmitted by the detector 75 while the disc 74 rotates with the internal gear 54 in a direction to wind the web 24 back onto the roll 35.

The computer 71 processes the information (number of pulses) which is furnished by the counter 70 and converts such information into a signal denoting a given angle. Based on the length s of transport of the web 24 and the corresponding unwinding angle phi, it is possible to ascertain the radius $r_2$ of the roll 35 in accordance with the equation $r_2 = s : phi$. If the known average thickness of the web 24 equals d, and the known radius of the core 36a equals $r_1$, the length L of the web 24 which is convoluted to form the roll 35 can be calculated in accordance with the equation $$L = (r_2{}^2 - r_1{}^2) \times \frac{phi}{d}.$$

The length L of the web 24 forming the roll 35 decreases by the value s in response to each advancement of the web into the copying station of the machine 50 so that the length Ln after the $n^{th}$ web advancing step can be ascertained in accordance with the equation $$L_n = L - n \times s$$

wherein n is the number of advancing steps.

The outer diameter $r_{2n}$ of the roll 35 after the $n^{th}$ advancing step can be ascertained in accordance with the equation $$r_{2n} = \sqrt{r_1{}^2 + \frac{L_n \times d}{phi}}.$$

This renders it possible to ascertain the angle $phi_n$ through which the roll 35 must be turned in order to loosen the web 24 in the region of the outermost convolution prior to each advancing step, namely to loosen the web to an extent which is necessary to enable the rollers 78 to advance the web 24 through a distance corresponding to the selected format of pictures but without rotation of the roll 35. Thus, the relaxing means for the web 24 ensures that the rollers 78 need not unwind the web 24 off the roll 35 by overcoming the inertia of the roll and by thus risking slippage of the peripheral surfaces of the rollers 78 relative to the web 24. The angle $phi_n$ can be calculated in accordance with the equation $$phi_n = \frac{s}{\sqrt{\left(\frac{s}{phi}\right)^2 - \frac{n \times s \times d}{phi}}}.$$

Since the preceding calculations rely on an average thickness d of the web 24, the actual angle $phi_n$ is preferably selected to exceed the angle which is ascertained in accordance with the immediately preceding equation for $phi_n$. In other words, the actual unwinding of web 24 exceeds that which is necessary in accordance with the equation for $phi_n$ in order to guarantee that the portion of the web 24 between the outermost convolution 35a of the roll 35 and the nip of the rollers 78 is sufficiently loose to avoid tensioning of the web and slippage of the peripheral surfaces of the rollers 78 relative to the tensioned web during advancement of the web by a distance which is necessary in accordance with the selected format of pictures of film frames which are imaged onto the web 24 at the copying station of the machine 50.

It is presently preferred to repeat the calibrating operation at certain intervals, for example, upon completed copying of each of a series of exposed and developed customer films. This renders it possible to ascertain the actual thickness d of the web 24 with a higher degree of accuracy after each calibrating operation which, in turn, renders it possible to more accurately select the angle $phi_n$. If the angle which is ascertained as a result of the second calibrating operation is $phi_2$, the actual thickness d of the web 24 can be ascertained in accordance with the equation $$d = \left(\left(\frac{s}{phi}\right)^2 - \left(\frac{s}{phi_2}\right)^2\right) \times \frac{pi}{s \times n}$$

wherein n is the number of transporting steps between the first and second calibrating operations.

Another advantage of the above outlined ascertaining procedure is that the person in charge is always in possession of information regarding the quantity of web 24 in the roll 35.

If the cassette 20 is to be withdrawn from the compartment 51, for example, in order to insert a cassette containing a wider web or a narrower web, the person in charge transmits an appropriate signal to the computer 71 from the terminal 79a or from another terminal. The motor 77 is then controlled directly by the computer 71 in such a way that the rollers 78 return the web 24 into the cassette 20. Reintroduction of the web 24 into the housing of the cassette 20 is interrupted when the detector 73 transmits a signal denoting the detection of the leader 24a of the web 24. This ensures that the leader 24a is maintained in the same position as upon completed insertion of the respective cassette 20. The motor 77 is then disconnected from the energy source so that the rollers 78 are free to rotate, i.e., that such rollers act not unlike idler rollers. The person in charge then pivots the actuator 57 back to the position of FIGS. 3 and 4a whereby the gear segments 66 rotate the mating gears 41 on their way through the respective apertures 58 in the internal wall 53a and back into the casing of the copying machine 50 adjacent the compartment 51. Consequently, the rollers 39, 40 move the web 24 rearwardly to locate the leader 24a in the same position as prior to insertion of the cassette 20 into the compartment 51. The pawl 60 is disengaged from the pin 33 and is retracted into the casing of the machine 50 by leaving the compartment 51 through the aperture 59. The cassette 20 is then ready to be extracted from the compartment 51.

If the roll 35 is used up (exhausted) in the course of a copying operation, detection of the trailing end of the web 24 is signalled by the detector 72. This induces the computer 71 to immediately arrest the rollers 78 by way of the motor 77, and the computer 71 can initiate the generation of a visible, audible and/or otherwise detectable signal to inform the person in charge that the cassette 20 must be replaced with a cassette containing a fresh roll 35. Removal of the empty cassette 20 must be preceded by the aforediscussed manipulation of the actuator 57 which causes the rollers 39, 40 to drop the remnant of the web 24 into the housing 20a, 21 of the empty cassette 20. Such remnant is removed by the person in charge of reloading the cassette 20 upon withdrawal of the empty cassette from the compartment 51.

An advantage of the cassette 20 is that it need not confine any parts of the means for unwinding the web 24 from the roll 35. This renders it possible to employ a compact housing. Furthermore, the web 24 need not form a loop in the interior of the cassette 20 which renders it possible to further reduce the dimensions of the housing including the main section 20a and the cover 21. The motor 76 cooperates with the internal gear 54 and with one of the gears 36 to rotate the core of the roll 35. This renders it possible to dispense with the friction wheel 10 and to simplify the means (bearings 37, 38) for supporting the roll 35 in the chamber 22 of the cassette 20 because the roll 35 need not descend by gravity as its diameter decreases. The motor 76 further cooperates with the motor 77 for the externally mounted advancing rollers 78 to ensure that at least the outermost convolution 35a of the roll 35 is sufficiently loose in order to prevent tensioning of the web 24 between the roll 35 and the rollers 78, i.e., to prevent slippage of the peripheral surfaces of the rollers 78 relative to the pinched portion of the web 24 when the rollers 78 are called upon to advance a selected length of the web 24 into the copying station of the machine 50.

The aforediscussed calibrating operations are desirable and advantageous because they render it possible to ascertain the diameter or radius of the roll 35. By determining the radius or the diameter of the roll 35, the computer 71 can ensure that the motor 76 turns the roll 35 through an angle which suffices to guarantee that the web 24 remains loose in the region of the outermost convolution 35a as well as between such convolution and the nip of the advancing rollers 78. Each calibrating operation involves the advancement of a certain length of the web 24 from or into the chamber 22 of the cassette 20. At the same time, the structure which is shown in FIG. 6 determines the angle through which the roll 35 must be rotated about the axis of the core 36a in order to advance the aforementioned certain length of the web 24 into or from the chamber 22. By ascertaining such angle, the structure of FIG. 6 can determine the radius or the diameter of the roll 35 and this, in turn, enables the computer 71 to control the stepping motors 76, 77 in the aforedescribed manner, namely to ensure that the web 24 remains loose between the roll 35 and the nip of the advancing rollers 78. Once the radius or the diameter of the roll 35 is known, and since the desired length of increments of the web 24 to enter the copying station in response to each actuation of the motor 77 is also known, it is rather simple to regulate the operation of the motor 76 in such a way that the web 24 is not subjected to any, or any undue, tensional stresses in the region between the roll 35 and the rollers 78 when the rollers 78 are caused to rotate in order to advance a selected increment of the web 24 into the copying station.

As already described hereinabove, the structure of FIG. 6 further takes into consideration that the diameter of the roll 35 decreases in response to each actuation of the motor 77. In order to facilitate accurate determination of the rate of decrease of the diameter of the roll 35, the corresponding calculations are based first on the assumption that the thickness d of the web 24 matches or closely approximates an average value. However, and since the calibrating operation is preferably repeated at certain intervals (such as upon completion of copying of each of a series of successive exposed and developed customer films having 12, 24, 36 or another number of frames), repeated calibration and repeated determination of the diameter of the roll 35 render it possible to calculate the exact thickness d of the web 24. All that is necessary is to properly correlate the changes of the diameter of the roll 35 with the overall length of that portion of the web 24 which has been evacuated from the housing of the cassette 20. The accuracy of determination of the thickness d increases with each successive calibrating operation. This enables the structure of FIG. 6 to ensure that the non-convoluted length of the web 24 in the chamber 22 of the cassette 20 is sufficiently loose independently of the actual diameter of the roll 35.

An advantage of the aforedescribed step which precedes the actual calibrating operation and involves rotation of the core 36a in a direction to wind the web 24 onto the roll 35 is that the core 36a must rotate during calibration, i.e., that such operation does not merely involve elimination of slack at the outermost convolution or convolutions of the roll 35.

The rollers 39, 40 are not used to advance the web 24 into the copying station but rather to transport the leader 24a of the web preparatory to insertion of the cassette 20 into and preparatory to withdrawal of the cassette 20 from the compartment 51 of the copying machine 50. These rollers ensure that the leader 24a need not extend from the chamber 22 during introduction of the cassette 20 into the compartment 51. The latter is designed in such a way that its dimensions need not exceed the dimensions of the housing of the cassette 20. This can be achieved in a manner as described with reference to FIG. 3, i.e., only the internal gear 54 extends into the compartment 51 in order to receive one of the gears 36 but the locking pawl 60 and the gear segments 66 are then retracted into the casing of the copying machine 50 adjacent the compartment 51. Furthermore, the locking pin 33 is always confined in the recess 32 and the gears 36 are confined in the recesses of the respective bearings 37, 38 to thus ensure that the dimensions of the compartment 51 need not exceed the dimensions of the housing of the cassette 20.

The rollers 39, 40 are in continuous engagement with the web 24 irrespective of whether the cassette 20 is located within or without the compartment 51. As already described above, the rollers 39, 40 (actually the roller 40) can be rotated by hand (through the medium of the gears 41) or automatically by the gear segments 66 in response to pivoting of the actuator 57 from the position of FIG. 4a to the position of FIG. 4c or in the opposite direction. An advantage of the actuator 57 and of other parts of the fixing mechanism which is shown in FIGS. 4a to 4c is that a single manipulation (of the actuator) is necessary to lock the freshly inserted cassette 20 in the compartment 51 (by engaging the pawl 60 with the pin 33) and to simultaneously advance the leader 24a of the web 24 through the medium of the gear segments 66, gears 41 and rollers 39, 40. The same operation is performed in reverse when the actuator 57 is pivoted from the position of FIG. 4c to the position of FIG. 4a in order to permit extraction of the cassette 20 from the compartment 51. Such extraction is preceded by retraction of the leader 24a of the web 24 from the nip of the rollers 78 into the chamber 22 but the leader 24a remains in the nip of the rollers 39, 40.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. Cassette for storage of rolls of convoluted web-shaped photosensitive material and for dispensing of such material, comprising a housing having an internal chamber, means for rotatably supporting a roll of convoluted material in said chamber, and an outlet for evacuation of material from said chamber; means for unwinding material from the roll in said chamber; and means for relaxing the material in said chamber between the roll and said outlet so that the material leaving the housing through said outlet to enter a processing unit is substantially free from any pronounced tensional stresses, said relaxing means comprises means for forming at least one loop of photosensitive material in said chamber between the roll and said outlet; the roll, the loop and the outlet being disposed substantially coplanar with respect to each other.

2. The cassette of claim 1 for storage of rolls including outermost convolutions of web-shaped photosensitive material, wherein said unwinding means includes a member directly contacting the outermost convolution of a roll in said chamber.

3. The cassette of claim 2, wherein said supporting means includes means for maintaining the outermost convolution of a roll in said chamber in direct contact with said member under the action of gravity irrespective of the diameter of the roll.

4. The cassette of claim 1, wherein said relaxing means includes material advancing means at said outlet.

5. The cassette of claim 4, wherein said advancing means is located in said chamber adjacent to said outlet.

6. The cassette of claim 4, wherein said advancing means comprises at least one driven rotary element at one side of said outlet and at least one second rotary element at the other side of said outlet.

7. The cassette of claim 6, wherein said housing includes means for moving said at least one second rotary element toward and away from said at least one driven rotary element.

8. The cassette of claim 4, further comprising means for generating signals in response to development of tensional stresses in photosensitive material between the roll in said chamber and said advancing means.

9. The cassette of claim 4, wherein said relaxing means further comprises means for comprising the rate of unwinding of material from the roll in said chamber with the rate of advancement of material at said outlet.

10. The cassette of claim 9, wherein said comparing means comprises a computer.

11. The cassette of claim 1, further comprising signal generating means for monitoring the size of the loop in said chamber.

12. The cassette of claim 1 for storage of rolls of convoluted web-shaped photosensitive material having at least two different widths, wherein said housing comprises at least one partition and guide means for removably locating said at least one partition in said chamber so that the chamber can receive a roll of material having a first width when said at least one partition is located by said guide means and that the chamber can receive a roll of material having a greater second width upon removal of said at least one partition from said guide means.

13. The cassette of claim 1, wherein said housing and at least one of said unwinding and said relaxing means comprise two halves which are mirror images of each other with reference to a plane which is normal to the axis of rotation of a roll in said chamber.

14. Cassette for storage of rolls of convoluted web-shaped photosensitive material and for dispensing of such material, comprising a housing having an internal chamber, means for rotatably supporting a roll of convoluted material in said chamber, and an outlet for evacuation of material from said chamber means for unwinding material from the roll in said chamber; and means for relaxing the material in said chamber between the roll and said outlet so that the material leaving the housing through said outlet to enter a processing unit is substantially free from any pronounced tensional stresses, said roll including an outermost convolution of web-shaped photosensitive material, wherein said relaxing means includes means for rotating said unwinding means so that the outermost convolution of the roll in said chamber is loose, the roll and the outlet being disposed substantially coplanar with respect to each other.

15. The cassette of claim 14, further comprising manually operable means for advancing photosensitive material at said outlet.

16. The cassette of claim 15, further comprising means for fixing said housing in a predetermined position relative to the processing unit.

17. The cassette of claim 16, wherein said fixing means comprises means for operating said advancing means.

18. The cassette of claim 17, wherein said fixing means comprises an actuator movable from a first position to a second position for fixing said housing in said predetermined position and to simultaneously evacuate a preselected length of photosensitive material from said chamber through said outlet by way of said advancing means, and from said second position to said first position to thereby permit the housing to leave said predetermined position and to simultaneously return said preselected length of photosensitive material into said chamber through said outlet by way of said advancing means.

19. The cassette of claim 14, wherein said housing further comprises a mouth which defines said outlet and includes two confronting sections having registering openings.

* * * * *